(12) United States Patent
Metzler et al.

(10) Patent No.: US 10,740,606 B2
(45) Date of Patent: Aug. 11, 2020

(54) METHOD FOR ASSIGNING PARTICULAR CLASSES OF INTEREST WITHIN MEASUREMENT DATA

(71) Applicant: HEXAGON TECHNOLOGY CENTER GMBH, Heerbrugg (CH)

(72) Inventors: Bernhard Metzler, Dornbirn (AT); Bernd Reimann, Heerbrugg (CH); Alexander Velizhev, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/853,460

(22) Filed: Dec. 22, 2017

(65) Prior Publication Data

US 2018/0181789 A1 Jun. 28, 2018

(30) Foreign Application Priority Data

Dec. 23, 2016 (EP) .................................... 16206779

(51) Int. Cl.
*G06K 9/00* (2006.01)
*G06K 9/62* (2006.01)
*G06K 9/46* (2006.01)
*G06K 9/66* (2006.01)

(52) U.S. Cl.
CPC ....... *G06K 9/0063* (2013.01); *G06K 9/00201* (2013.01); *G06K 9/00624* (2013.01); *G06K 9/00718* (2013.01); *G06K 9/46* (2013.01); *G06K 9/6201* (2013.01); *G06K 9/6262* (2013.01); *G06K 9/66* (2013.01); *G06T 2207/30192* (2013.01)

(58) Field of Classification Search
CPC .......... G06K 9/00201; G06K 9/00624; G06K 9/0063; G06K 9/00718; G06K 9/46; G06K 9/6201; G06K 9/6262; G06K 9/66; G06T 2207/30192
See application file for complete search history.

(56) References Cited

U.S. PATENT DOCUMENTS

| | | | |
|---|---|---|---|
| 9,489,635 B1 | 11/2016 | Zhu | |
| 2008/0103996 A1 | 5/2008 | Forman et al. | |
| 2009/0087029 A1* | 4/2009 | Coleman | G06K 9/00208 382/103 |
| 2009/0244291 A1* | 10/2009 | Saptharishi | G06K 9/00771 348/187 |

(Continued)

OTHER PUBLICATIONS

Extended European Search Report dated Jun. 19, 2017 as received in Application No. 16206779.7.

(Continued)

*Primary Examiner* — Ian L Lemieux
(74) *Attorney, Agent, or Firm* — Maschoff Brennan

(57) ABSTRACT

A method and system for surveying and/or metrology for assigning particular classes of interest within measurement data, wherein an assignment of at least one measurement object to a first class of interest within the measurement data based on a classification model, is processed by a feedback procedure providing feedback data for a training procedure which provides update information for the classification model, wherein the training procedure is based on a machine learning algorithm, e.g. relying on deep learning for supervised learning and/or unsupervised learning.

21 Claims, 3 Drawing Sheets

(56) References Cited

U.S. PATENT DOCUMENTS

| | | | |
|---|---|---|---|
| 2009/0310867 A1* | 12/2009 | Matei | G06T 7/11 |
| | | | 382/195 |
| 2010/0104191 A1* | 4/2010 | McGwire | G06K 9/0063 |
| | | | 382/190 |
| 2011/0274362 A1 | 11/2011 | Isomae et al. | |
| 2015/0269438 A1* | 9/2015 | Samarasekera | G06K 9/00637 |
| | | | 382/154 |
| 2015/0294155 A1* | 10/2015 | Sant | G06K 9/00657 |
| | | | 382/195 |
| 2018/0012082 A1* | 1/2018 | Satazoda | G06K 9/00805 |

OTHER PUBLICATIONS

Mogelmose Andreas et al.: "Detection of U.S. Traffic Signs", IEEE Transactions on Intelligent Transportation Systems, IEEE, Piscataway, NJ, USA, vol. 16, No. 6, Dec. 1, 2015, pp. 3116-3125.

\* cited by examiner

METHOD FOR ASSIGNING PARTICULAR CLASSES OF INTEREST WITHIN MEASUREMENT DATA

CROSS-REFERENCE TO RELATED APPLICATIONS

This application claims priority to European Patent Application No. 16206779 filed on Dec. 23, 2016. The foregoing patent application are incorporated herein by reference.

FIELD OF INVENTION

The present invention relates to a method and system for surveying and/or metrology. In particular, the present invention relates to a system and method for terrestrial surveying, airborne surveying, mobile mapping, a measurement by a total station, terrestrial laser scanning, a measurement by a coordinate measurement machine, a measurement by a laser tracker, a measurement by an articulated arm, and a measurement by a triangulation sensor, for assigning particular classes of interest within measurement data.

BACKGROUND

In the art of general classification of measurement data, raw data, e.g. point cloud data, imaging data (2D or 3D), multi-spectral data, radar data, lidar data, data by a total station, or data from a laser tracker, are transformed into higher-level geometrical and semantic representations, e.g. for surface reconstructions, geometry fitting, 3d-modelling in particular surface meshing, fitting of parametric 2D or 3D primitives, selective processing, data decimation, data visualization, benchmarking, and/or object detection or recognition.

Targets of interest within the measurement data are often classified into semantic and geometrical target classes, with possible hierarchical sub-classes, e.g.
  semantic target classes
    terrain: man-made or natural
    vegetation: high (trees) or low (bushes)
    hardscape: buildings, cars, and remaining objects, e.g. wherein buildings can consist of wall, roof, balcony, window, door, etc.
    application-specific classes: workpieces, products, tools, etc.
    classes for filtering and/or data reduction, e.g. classes for automatically filtering out unwanted points like scanning artefacts caused by moving objects or vegetation which may not be relevant for projects in construction,
  geometrical target classes
    contour lines ("breaklines"), i.e. linear features where the curvature radius of the surface is small, i.e. along which the orientation ("normal vector") of the underlying surface exhibits an unusual discontinuity
    planar surfaces
    objects with a predefined geometry (e.g. long vertical cylinders resembling light posts).

For example, point cloud classification might be based on feature vectors consisting of point- or region-wise properties, e.g. such as
  geometry in local neighborhood, e.g. based on the eigenvalues/-vectors of the covariance matrix and/or moments of structure tensors in the neighborhood indicating properties like planarity, curvature, linearity, orientation and/or roughness
  height information such as vertical range, height to ground/ceiling, etc.
  intensity and/or color, and variations thereof.

For example, classification on image data might be based on feature vectors consisting of local, region-wise or global properties, e.g. such as
  histogram of oriented gradients or dense SIFT features (scale-invariant feature transform)
  Haar-like features
  Bag-of-Words features
  image features based on image oversegmentation.

In particular, in a machine learning framework for deep learning, e.g. based on Convolutional Neural Networks, features and classification rules are extracted automatically from training data.

The assignment of such classes and subclasses within measurement data still requires time-consuming processes and the human eye and human judgement. In attempt to automatize such assignment processes by computer implemented solutions many computational challenges are faced.

Often the acquired data are unstructured and highly inhomogeneous with strong variations in the point density, e.g. in a 3D point cloud, caused by a quadratic decrease of the point density with distance to the point cloud capturing device, as well as a decrease of laser/light intensity with distance and points falling below a detection threshold or points that are captured with reduced accuracy (low S/N). In a scanning dataset, specific scan patterns may be used with different spacing of scan points in x, y, z direction, or data sets may be incomplete due to occlusions.

In case of image data, variability of the appearance of an object might be very high as well. For example, object appearance depends on viewing direction, distance to the object, image resolution, lighting conditions and image sensor properties. Furthermore, in contrast to 3D point clouds an absolute scale of an object on the image is not defined.

Therefore, multiscale classification features describing short-, mid-, and long-range semantic and geometric properties, e.g. further including orientation and height information, are required, and computational algorithms need to cope with inhomogeneous and incomplete datasets. Moreover, since 10's to 100's of millions of data points or image pixels need to be processed, efficient algorithms, e.g. implementing parallel computing, and large data storage are required.

There are many applications with different definitions of classes. For example, for one application the classification of a point cloud into three classes (e.g. "man-made", "vegetation" and "terrain") might be sufficient, whereas another application might require splitting up vegetation in separate classes for "trees", "bushes", etc.

Then again, for data reduction it might be sufficient to only have a few selective classes, e.g. in a simple case filtering a dataset based on only two classes, i.e. "data points to keep" and "data points to filter out".

Moreover, an object might look different if data are recorded at different places and during different seasons of the year. For example, since buildings in Asia may look quite different from buildings in Europe, a classifier that is purely trained based on data captured in Europe might not work well in other regions of the world.

Therefore, great efforts relating to manual classification steps, e.g. manual data filtering and manual data assignment, are required. On the other hand, these ongoing efforts may be beneficially used as a departure point for an inventive classification and/or training workflow based on machine learning.

Application of machine learning algorithms allows an automation of different processes in classifying measurement data. Such a classification framework, based on a subclass of general machine learning (ML), provides a very efficient "learning approach" for pattern recognition as compared to rule-based programming. Machine learning algorithms can deal with tasks of large complexity, make use of implicit or explicit user feedback, thus becoming adaptive, and provide "per point" probabilities of the classification. This saves time, reduces processing costs and decreases amount of manual work.

In so-called "supervised ML" an algorithm implicitly learns which characterizing properties (i.e. a combination of features) define target properties of points (such as class membership, affiliation to a contour line, etc.) according to definitions made by the user when labelling training data.

On the other hand, in so-called "unsupervised ML" the algorithm finds hidden structure in unlabeled data, e.g. based on the data alone or with the aid of additional information such as for example a class specific (a-priori) model based on a specific classifier or a set of classifiers. This is also called "clustering" or "segmentation" and involves grouping points of the measurement data into categories based on some measure of inherent similarity or distance.

Probabilistic classification algorithms further use statistical inference to find the best class for a given instance. Instead of simply determining a "best" class for each instance, probabilistic algorithms provide a probability of the instance being a member of each of the possible classes, wherein normally the one class with the highest probability is selected. This has several advantages over non-probabilistic algorithms, i.e. associating a confidence value for weighting its choice, and consequently, providing an option to abstain a choice when its confidence value is too low.

However, usage of machine learning algorithms requires a lot of training data. In case of supervised machine learning also labeling information (i.e. assignment of the object classes to the data) is necessary. The data acquisition, preparation and labeling requires a lot of efforts and time.

Summarizing, it is difficult in practice to use one pre-trained classifier for large varieties of different applications, definitions of classes, object's appearance, etc.

Even with increasing computing power and data storage, the large complexity required for automatically assigning particular classes of interest within measurement data pushes traditional methods, such as rule-based computational methods, to their limits, and a high degree of human interaction is still required.

BRIEF SUMMARY

It is therefore an object of some embodiments of the present invention to improve processes for assigning classes of interest within measurement data in surveying and/or metrology, particularly by improving current workflows and/or by enabling new workflows and applications.

A particular object of some embodiments is to improve on training of a classifier in a classification algorithm, wherein training is based on machine learning.

A further object of some embodiments is to reduce the error rate of automated classification, in particular to increase the object detection rate, to reduce false alarms and/or to reduce the need for human intervention.

Those objects are achieved by realising the features of the independent claim. Features which further develop the invention in an alternative or advantageous manner are described in the dependent patent claims.

Some embodiments of the invention relates to a method for surveying and/or metrology for assigning a class of interest within measurement data, the method comprising an acquisition of measurement data, particularly at least one of imaging data, multi-spectral data, radar data, lidar data, and point cloud data, for at least one measurement object, which is at least partly captured by the measurement data; and a classification of the measurement data by a classification algorithm for providing an assignment of the at least one measurement object—represented by a single data point of the measurement data or a multitude of measurement points—to a first class of interest within the measurement data, based on the measurement data and a classification model comprising at least the first class of interest.

For example, the method might be applied to terrestrial surveying, airborne surveying, mobile mapping, a measurement by a total station, terrestrial laser scanning, a measurement by a coordinate measurement machine, a measurement by a laser tracker, a measurement by an articulated arm, or a measurement by a triangulation sensor; wherein measurement data may comprise ground penetrating radar data, point cloud data, e.g. resulting from lidar measurements or generated from image data, multi-spectral imaging data from a 2D camera or a 3D camera, data from a laser tracker, a lidar scanner, etc.

The measurement object might be a physical 2D or 3D object, e.g. a specific surface, landscapes, a workpiece, a reflector, or a tool, with specific properties, e.g. a specific multi-spectral or electric response, wherein the measurement object might be captured by a single data point of the measurement data or a multitude of measurement points. Furthermore, the measurement data may comprise information from one object only, e.g. the full object being captured or only subparts of the object, or the data may comprise information on a multitude of different objects, as well as background data which is not foreseen for classification.

According to some embodiments of the invention, the assignment of the at least one measurement object to a first class of interest within the measurement data is processed by a feedback procedure providing feedback data comprising at least one of verification information for the assignment of the measurement object to the first class of interest, in particular at least one of a confirmation of the assignment, a rejection of the assignment, and a warning, particularly if the assignment is wrong or uncertain; change information of the assignment of the measurement object to the first class of interest, in particular at least one of removal of the assignment and re-assignment to a second class of interest; a definition of a new class of interest, e.g. defining a new class from scratch, by merging existing classes into a new class or by splitting an existing class into new classes, or by adapting an existing class; an instruction for removal of a class of interest from the classification model; a first selection of the measurement data to be used for the classification; and identification of a second selection of the measurement data to be ignored for further processing; wherein the feedback data is provided to a training procedure, the training procedure being based on a machine learning algorithm, e.g. relying on deep learning for supervised learning and/or unsupervised learning, and providing update information for the classification model.

In particular, with the inventive method suitable training data may be acquired and prepared with each measurement task, particularly reducing data storage, overhead time, and false classification, which lead to more accurate classification and more efficient training of a multitude of classifiers for a wide range of different applications.

The feedback procedure might be executed close to real-time, e.g. during measuring by means of a feedback unit being part (integral or external) of the measurement device, or the feedback procedure might be executed offline, e.g. during a dedicated feedback workstep, e.g with a dedicated software tool installed on a computer.

In a particular embodiment the feedback data are provided based on at least one of explicit feedback by means of the feedback procedure, in particular by an operator of a measurement device used for the acquisition of the measurement data and/or by a software used for processing of the measurement data; and implicit feedback, in particular based on at least one of system settings of the measurement device used for the acquisition of the measurement data, particularly wherein the system settings are defined by an operator of the measurement device, a quality assessment of the measurement data, particularly an automatic quality assessment by a control and evaluation functionality of the classification unit, and an interpretation of a lack of explicit feedback as a confirmation of the assignment.

For example, the control and evaluation functionality of the classification unit may be provided by a display and trigger keys integral with the measurement device, a touch screen of an external operating device, or an input option for a dedicated office software. In a further embodiment the feedback procedure is supported by a notification functionality providing a status information of the classification, in particular comprising at least one of a notification when the assignment is finished, a notification when the classification has failed, and a quality assessment on the assignment, e.g. a warning if the assignment is uncertain, possibly with an indication on the degree of the uncertainty or the cause of the uncertainty.

For example, an uncertainty might occur for borderline cases within feature space, e.g. wherein—based on a given uncertainty in calculating feature vectors, particularly when the object lies close to a borderline or on a borderline in feature space—an object has similar probability to be assigned to multiple classes. In such cases it might further be useful if the feedback procedure automatically asks for explicit user feedback before continuing processing.

The notification functionality may be based on at least one of a visual representation of the status information, in particular a visual representation of the measurement data on a display with a defined color coding for sub samples of the measurement data being assigned to different classes of interest and/or by a text message, and an acoustic notification of the status information, particularly an audio code or a voice signal, in particular wherein the notification functionality triggers the feedback procedure.

For example, the feedback procedure might comprise a visualization of a checklist, a functional diagram, a schematic illustration, or an image, e.g. a 2D or 3D image of the measured scene wherein objects of specific classes are highlighted by dedicated colors.

For example, an acoustic notification might be an audio signal or an audio code such as a single beep signal or a sequence of beep signals when classification might have finished or failed, or the acoustic notification might be more complex, e.g. a voice signal giving detailed information on the classification status (e.g. "point stored") and/or giving additional information on the classification result (e.g. "hydrant—point stored"). For example, by also indicating the classification result ("hydrant"), a user can take immediate action if the classification is incorrect.

Based on the notification, a user might then review the classification by input means of the measuring device, an operating device associated with the measuring device, or input options of a dedicated office software running on a computer.

When the feedback procedure is triggered by the notification functionality, an operator might for example be given a defined time window after completion of the assignment option to enter feedback, wherein refraining from doing so is interpreted as confirmation of the assignment, or an input request might be triggered requiring a user to confirm the classification before sending data to the training procedure.

In a particular embodiment, the training procedure is adapted for at least one of processing feedback data provided by classifications of a multitude of measurement data, in particular wherein the multitude of measurement data being acquired by a multitude of measurement devices; and processing additional data provided to the training procedure, in particular the additional data comprising at least one of a digital building model, particularly a CAD model, digital mapping data, satellite data, imaging data, and footprint data.

Therefore, many operators, e.g. surveyors working in a surveying office, may contribute during their daily work to the improvement of a classifier of a classification model and all of them benefit from an improved classifier after an update of a classification unit on their measurement instruments or an office software.

In another embodiment the update information for the classification model is made available to a multitude of classification algorithms, in particular classification algorithms running on a multitude of classification units with a defined access to the update information and a defined update procedure.

For example, the improved classifiers may be stored and shared on a central database, e.g. in a sense of a "classifier app-store", wherein access to specific classifiers might be based on a specific update interval, a user group for a specific measurement application, a measurement location, or a measurement time, wherein the update might be performed automatically or wherein an operator of a measurement device can download the required model from the central database for a specific measuring task.

In particular, the classification model might be provided out of a set of different models, differing from each other by at least one of a region-specific classification parameter; a region-specific class of interest; a time-specific classification parameter; a time-specific class of interest; an application-specific classification parameter; and an application-specific class of interest; wherein the classification model being provided based on at least one of a time information, a location information, and an application information, corresponding with the acquisition of the measurement data, particularly provided by acquisition of additional data of a global positioning system, in particular for classifying at least one of seasonal vegetation, region-specific vegetation, and region-specific infrastructure, particularly a building type.

The classification performance is highly dependent on the type and characteristics of the measurement data to be classified. Therefore, a choice between different algorithms and different sets of classification parameters is required. For example, the classification might be based on at least one of a class of interest based on a semantic property, in particular based on at least one of terrain, vegetation, and hardscape; a class of interest based on a geometrical property, in particular based on at least one of planar surfaces, breaklines, and a 3D primitive; linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; deep learning, in particular based on a neural network, particularly a convolutional neural network; and learning vector quantization.

Some embodiments of the invention further relate to a system for surveying and/or metrology for assigning a class of interest within measurement data, comprising a measurement device with a data acquisition unit for an acquisition of measurement data, particularly at least one of imaging data, multi-spectral data, radar data, lidar data, and point cloud data, for at least one measurement object, which is at least partly captured by the measurement data; and a classification unit for executing a classification of the measurement data by a classification algorithm for providing an assignment of the at least one measurement object to a first class of interest within the measurement data, based on the measurement data and a classification model made available to the classification unit comprising at least the first class of interest.

According to some embodiments of the invention, the system further comprises a feedback functionality for processing the assignment by a feedback procedure providing feedback data comprising at least one of verification information for the assignment of the measurement object to the first class of interest, in particular at least one of a confirmation of the assignment, a rejection of the assignment, and a warning, particularly if the assignment is wrong or uncertain; change information of the assignment of the measurement object to the first class of interest, in particular by at least one of removal of the assignment and re-assignment to a second class of interest; a definition of a new class of interest, in particular by at least one of modifying an existing class, splitting an existing class into at least two new classes, and merging multiple existing classes into a new class; an instruction for removal of a class of interest from the classification model; a first selection of the measurement data to be used for the classification; and identification of a second selection of the measurement data to be ignored for further processing; wherein the feedback data is provided to a training unit comprising a training procedure, the training procedure being based on a machine learning algorithm and providing update information for the classification model.

In a particular embodiment of the system the feedback data are provided based on at least one of explicit feedback by means of the feedback functionality, in particular by an operator of the measurement device for the acquisition of the measurement data and/or by a software used for processing of the measurement data; and implicit feedback, in particular based on at least one of system settings of the measurement device, particularly wherein the system settings are defined by an operator of the measurement device, a quality assessment of the measurement data, particularly an automatic quality assessment by a control and evaluation functionality of the classification unit, and an interpretation of a lack of explicit feedback as a confirmation of the assignment.

A further embodiment relates to a system wherein the feedback procedure is supported by a notification functionality providing a status information of the classification, in particular comprising at least one of a notification when the assignment is finished, a notification when the classification has failed, and a quality assessment on the assignment, wherein the notification functionality being based on at least one of a visual representation of the status information, in particular a visual representation of the measurement data on a display with a defined color coding for sub samples of the measurement data being assigned to different classes of interest and/or by a text message; and an acoustic notification of the status information, in particular an audio code or a voice signal; in particular wherein the notification functionality triggers the feedback procedure.

In another embodiment the training procedure is adapted for at least one of processing feedback data provided by classifications of a multitude of measurement data, in particular wherein the multitude of measurement data being acquired by a multitude of measurement devices; and processing additional data provided to the training procedure, in particular the additional data comprising at least one of a digital building model, particularly a CAD model, digital mapping data, satellite data, imaging data, and footprint data.

In a particular embodiment the system is characterized in that the update information for the classification model is made available to a multitude of classification algorithms, in particular classification algorithms running on a multitude of classification units with a defined access to the update information and a defined update procedure.

Another embodiment relates to a system with the classification model being provided out of a set of different models, differing from each other by at least one of a region-specific classification parameter; a region-specific class of interest; a time-specific classification parameter; a time-specific class of interest; an application-specific classification parameter; and an application-specific class of interest; wherein the classification model being provided based on at least one of a time information, a location information, and an application information, corresponding with the acquisition of the measurement data, particularly provided by acquisition of additional data of a global positioning system, in particular for classifying at least one of seasonal vegetation, region-specific vegetation, and region-specific infrastructure, particularly a building type.

In particular, the classification might be based on at least one of a class of interest based on a semantic property, in particular based on at least one of terrain, vegetation, and hardscape; a class of interest based on a geometrical property, in particular based on at least one of planar surfaces, breaklines, and a 3D primitive; linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; deep learning, in particular based on a neural network, particularly a convolutional neural network; and learning vector quantization.

BRIEF SUMMARY OF THE DRAWINGS

The method and system according to the invention are described or explained in more detail below, purely by way of example, with reference to working examples shown schematically in the drawing. Specifically.

The diagrams of the figures should not be considered as being drawn to scale. Where appropriate, the same reference signs are used for the same features or for features with similar functionalities.

DETAILED DESCRIPTION

Figure 1:
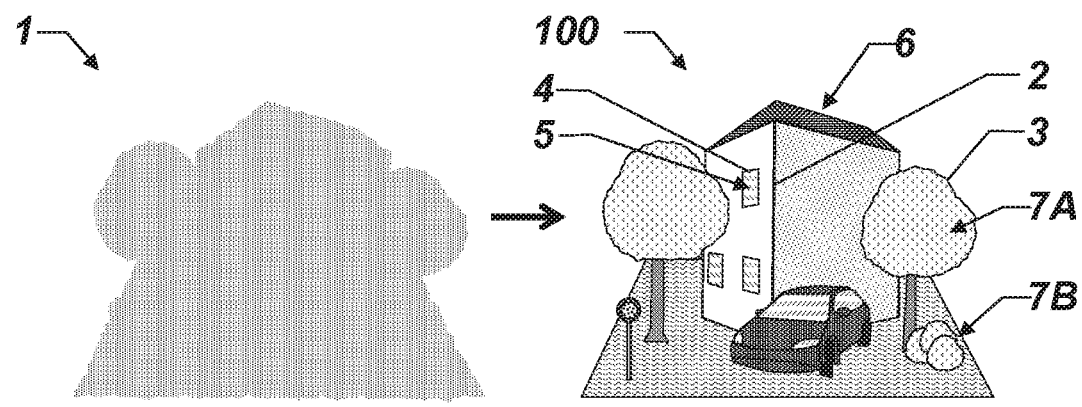
FIG. 1: an exemplary illustration for a classification process, here in the field of construction or building surveying.

FIG. 1 shows an exemplary illustration for a classification process, here in the field of construction or building surveying, wherein raw measurement data of a scene, here a point cloud 1, for example recorded by a terrestrial lidar scanning system or a photogrammetric reconstruction system, is classified with geometric classes, e.g. such as edge lines 2, border lines 3, or rectangular window frames 4, and semantic classes and subclasses, e.g. such as windows 5, roof 6, vegetation, e.g. divided into (high) trees 7A and (low) bushes 7B, in order to transform the initial point cloud 1 into a higher level representation of the point cloud 100, e.g. for extracting more information or for monitoring purposes.

An automatic assignment of classes and subclasses within measurement data, e.g. a point cloud 1, often requires time-consuming preparation processes, in particular for defining dedicated classifying parameters, e.g. for the calculation of feature vectors consisting of point- or region-wise properties specific for a given classification scene, e.g. such as the geometry in local neighbourhood, orientation or curvature/roughness, eigenvalues/-vectors of covariance matrices and moments of structure tensors, intensity and color variations, etc.

Also the objects to be classified and the classes of interest within the measurement data may vary for different applications. Furthermore, often an initial rough classification of objects or contour lines is required, wherein in many cases the human eye and human judgement are still the best solution to identify an object within the measurement data.

Targets of interest within the measurement data are often classified into semantic and geometrical target classes, with possible hierarchical sub-classes, e.g. "man-made" or "natural terrain", "high" (trees) or "low" (bushes) "vegetation", contour lines, i.e. linear features along which the orientation (the normal vector) of the underlying surface exhibits an unusual discontinuity, planar surfaces, or 2D or 3D primitives such as circles, cylinders, ellipsoids, etc.

Application of machine learning algorithms allows an automation of different processes in classifying measurement data. Such a classification algorithm, based on a subclass of general machine learning (ML), provides a very efficient, adaptive "learning approach" for pattern recognition as compared to rule-based programming. Machine learning algorithms can deal with tasks of large complexity, make use of implicit or explicit user feedback and provide "per point" probabilities of the classification. This saves time, reduces processing costs and decreases amount of preparation work.

However, usage of machine learning algorithms requires a lot of training data. In case of supervised machine learning also labeling information (i.e. assignment of the object classes to the data) is necessary. Because of the complexity and the wide range of different applications with varying classification parameters and classes of interest, the data acquisition, preparation and labeling requires great effort.

Furthermore, for the selection of suitable training data a lot of data surplus is acquired, often pushing data handling and data storage to the limit. Modern measurement devices are able to acquire TB of data per day. The bottleneck is the transmission of the data from the measurement device to services e.g. running on the internet. Therefore, a data reduction, i.e. elimination of non relevant data or data without additional information content, directly on the measurement device based on classification feedback is advantageous. An example is the scanning of a planar wall which might be represented by some thousands of scanning points whereas only a few data points and parameters would be necessary for defining the position, orientation and dimension of the wall.

Figure 2:
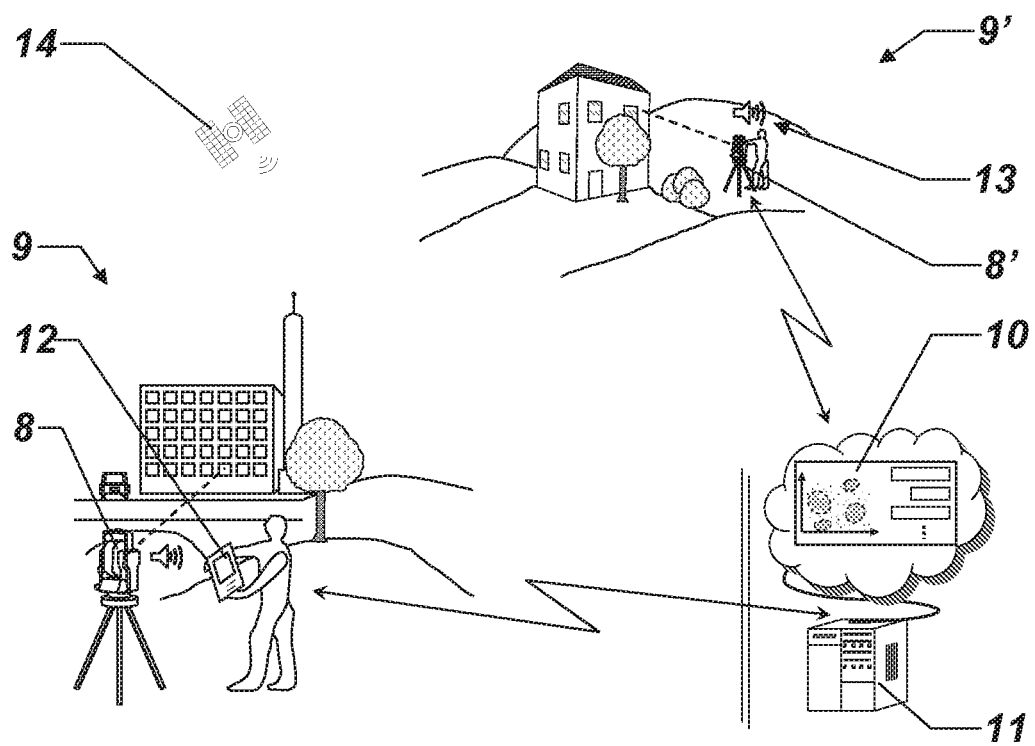
FIG. 2: an exemplary illustration of the inventive method of acquiring actual measurement data to be classified at different surveying locations and providing feedback information and feedback data for a training procedure of a classification model.

FIG. 2 illustrates a particular idea of the invention, here in the field of surveying with multiple laser scanners 8,8', to improve on the provision of training data, wherein the acquisition of suitable training data and classification feedback for a training procedure—particularly for a training procedure being based on machine learning—is acquired in parallel with each acquisition and classification of actual measurement data. Therefore, many operators, e.g. surveyors working in a surveying office, may contribute during their daily work to the improvement of a classifier of a classification model and all of them benefit from an improved classifier after an update of a classification unit on their measurement instruments or on an office software, e.g. in a sense of a "crowd-based-training" of classifiers.

For example, multiple laser scanners 8,8' are used for acquiring measurement data at different surveying locations 9,9'. The measurement data are automatically classified by a classification algorithm according to a classification model with predefined classes of interest and attributed classification parameters. The automatic classification result and the measurement data are then verified or adapted by a feedback procedure—explicitly, e.g. by operator feedback, and/or implicitly, e.g. by interpreting lack of explicit feedback as confirmation of the classification—and feedback data from the feedback procedure, e.g. comprising verified or adapted classification information and part of the measurement data, are provided to a training algorithm, e.g. stored on a central server 11, to be used as training data in a training procedure providing an improved classifier for a class of interest.

The classification model 10 with predefined classes of interest and attributed classification parameters might also be stored on the central server 11 and made available to a classification unit of the laser scanners 8,8', e.g. the classification unit being integral to the laser scanners 8,8' and/or being stored on an external device of the laser scanners 8,8', e.g. a dedicated tablet device 12 for operating the laser scanner 8.

Alternatively, the classification model might be stored on a dedicated office software for classifying the measurement data acquired by the laser scanners 8,8', or the measurement data acquired by the laser scanners 8,8' may be transferred to the central server 11 and the classification might be solely executed on the central server 11.

For providing feedback for the classification result, an operator of the laser scanner 8,8'—or an offline worker in an office using a dedicated office software containing the classification algorithm and being provided with the measurement data of the laser scanners 8,8'—might be provided with visual aids, e.g. by means of the tablet device 12 or an office software, and/or acoustic aids. For example, a user might be informed about the classification results e.g. on an instrument screen, an audio output 13 (e.g. "Manhole cover—point measured"), an LED color indicator, etc. In case of an incorrect assignment the user might then manually assign the correct class to the measurement point, e.g. by using trigger keys on the laser scanners 8,8', a touch screen of the tablet device 12, or an input option for a dedicated office software.

In particular, the feedback procedure might further be triggered by the notification functionality, e.g. an acoustic notification 13 that the classification is finished, e.g. giving the operator of the laser scanner 8,8' the option to provide feedback within a defined time window, wherein refraining from doing so is interpreted as confirmation of the assignment.

By making use of the feedback data from a multitude of feedback procedures, i.e. feedback taking into account dedicated applications and environments, e.g. taking into account a multitude of different workpieces, a time of day, daytime and night time measurements, a particular part of the year, a date or a season, a global position, a rough position such as longitude and latitude, or a climate zone, training of a dedicated classifier is improved, particularly training by a machine learning algorithm.

The improved classifiers may then be made available and distributed to dedicated classification algorithms, e.g. on dedicated measurement instruments and surveying software within a surveying office requiring specific classifiers such as for example classifiers for Western European and North American infrastructure vs. classifiers for Asian infrastructure, classifiers based on a season, e.g. summer vs. winter, and location, e.g. fir forest vs. oak forest.

For example, the improved classifiers may be stored on a central database, e.g. in a sense of a "classifier app-store", wherein access to specific classifiers might be restricted, e.g. based on user groups, wherein an operator of a measurement device can download the required classification model from the central database for a specific measuring task.

Alternatively, measurement instruments, here the laser scanners 8,8', may be provided with information about the application or the measurement task and/or with time and/or position data, e.g. from a global positioning system 14 or manually input by an operator, based on which dedicated classification models with region-specific, time-specific, and/or application-specific classifiers are automatically retrieved from the central database.

According to the invention, various implementations and arrangements are possible for the data acquisition unit, the classification unit, the feedback functionality, and the training unit. A selection of different implementations is schematically illustrated by FIGS. 3a to 3d.

Figure 3A:
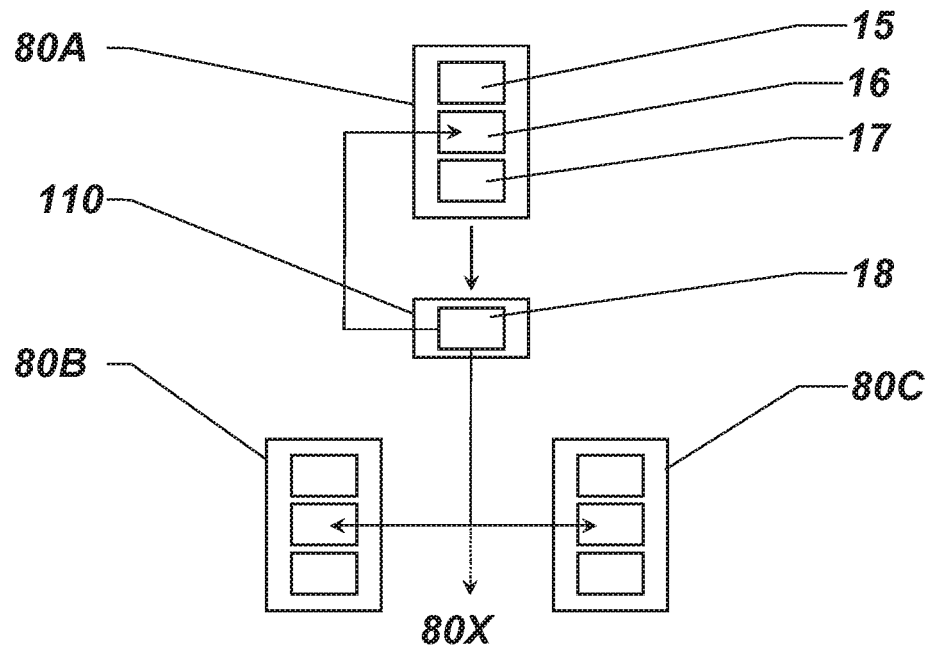
FIG. 3a-d: schematic embodiments of different arrangements of the data acquisition unit, the classification unit, the feedback unit, and the training unit.

FIG. 3a shows an embodiment wherein measurement data are acquired with a data acquisition unit 15 of a first measurement device 80A. Based on the measurement data and a classification model made available to a classification unit 16, a first classification is performed, i.e. an object—defined by a multitude of measurement points or a single measurement point of the measurement data—is automatically assigned to a class of interest given by the classification model, e.g. "manhole cover".

A user is informed about the classification results e.g. on an instrument screen, an audio output, an LED color indicator, etc. The user then—either implicitly or explicitly—provides feedback about the classification by means of a feedback unit 17 which creates feedback data, e.g. the user might confirm the classification result, change the result, define a new class of interest, delete a class of interest, and select a subsample of the measurement data to be used for future classification and/or training.

The feedback data are transmitted to a training unit 18, e.g. stored on an external server 110, where a classifier is trained and improved based on a training procedure based on machine learning.

An improved classification model, i.e. comprising an improved classifier or a set of improved classifiers, is then transmitted to a set of defined measurement devices 80A, 80B,80C,80X (not shown) for an update of their classification algorithms.

Alternatively or in addition (not shown), the improved classification model might be rolled out to a software product for classifying data, e.g. stored on a dedicated computer or central server.

Figure 3B:
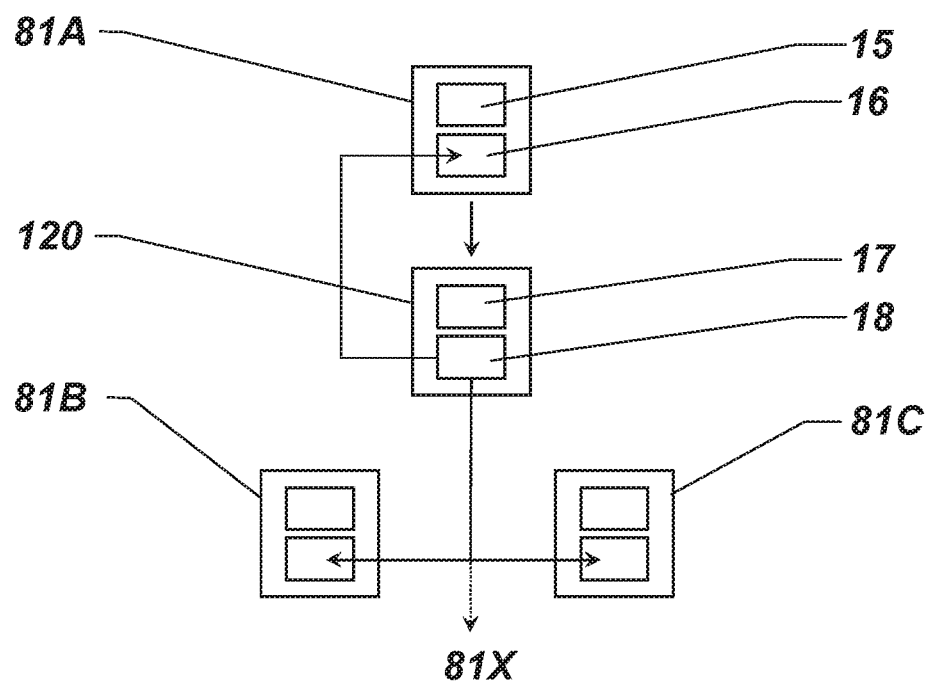

FIG. 3b shows an embodiment wherein measurement data are acquired by a data acquisition unit 15 of a first measurement device 81A. Based on the measurement data and a classification model stored on a classification unit 16 integral with the first measurement device 81A, a first classification is performed based on a classification model, i.e. an object is automatically assigned to a class of interest, e.g. "manhole cover".

The measurement data and the first classification result are transmitted to a computer 120 comprising a feedback unit 17, e.g. a dedicated software product such as Leica Infinity, where a user, e.g. an online user such as the operator of the measurement device 81A or an offline user in an office, provides feedback about the classification, which creates feedback data for a training unit 18, here stored on the same computer 120.

Then the improved classification model with an improved classifier is transmitted to a set of defined measurement devices 81A,81b,81C,81X (not shown) for an update of their classification algorithms, and/or the improved classification model might further be provided to dedicated software products (not shown) for classifying data, e.g. stored on dedicated computers or on a central server.

Figure 3C:
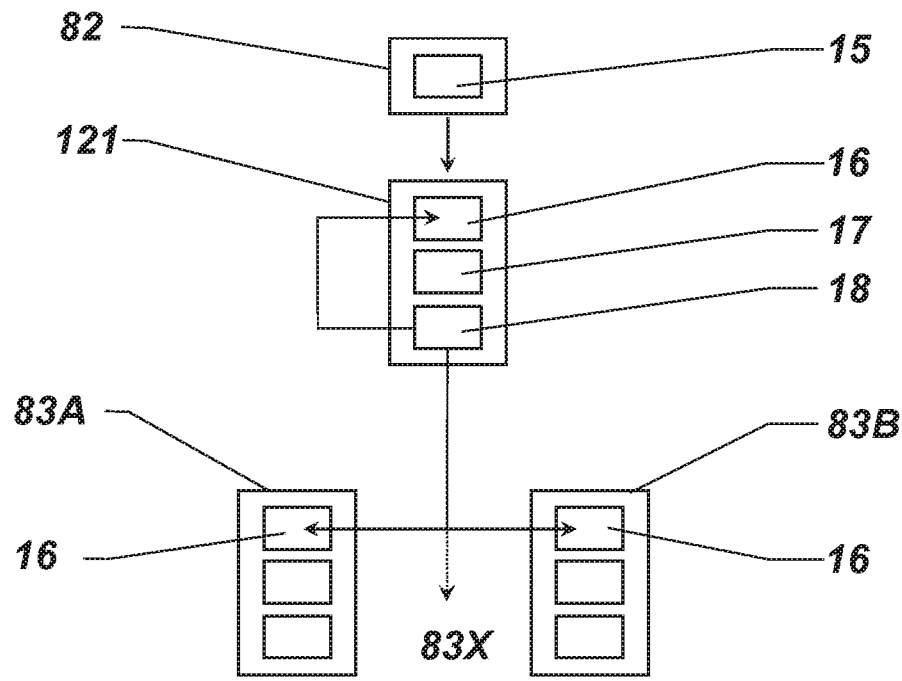

FIG. 3c shows an embodiment wherein measurement data are generated by a data acquisition unit 15 of a measurement device 82, e.g. a generic measurement device without classification functionality. The measurement data are imported into a dedicated software product, e.g. such as the Leica Cyclone software, which is stored on a computer 121 and comes with an automatic classification functionality 16 for classifying the measurement data based on a classification model. Here, the software further comprises a feedback functionality 17 and a training functionality 18, wherein a user, e.g. offline in an office, provides implicit or explicit feedback by means of the feedback functionality 17, which creates feedback data for the training functionality 18 of the software.

Then the improved classification model with an improved classifier is made available to the classification part 16 of the software product and transmitted to a set of defined measurement devices 83A,83B,83X (not shown) having a classification functionality 16 for an update of their classification algorithms, and/or the improved classification model might be further rolled out to different software products on different computers (not shown).

Figure 3D:
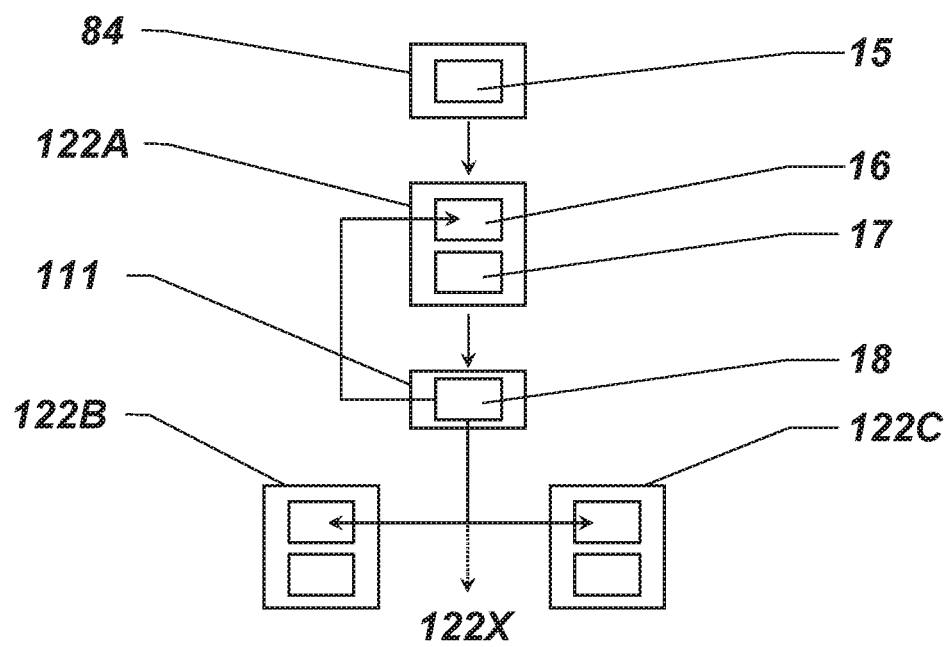

FIG. 3d shows an embodiment wherein measurement data are generated by a data acquisition unit 15 of a measurement device 84, e.g. a generic measurement device without classification functionality. The measurement data are transmitted onto a first computer 122A comprising a dedicated software product (e.g. Leica Cyclone) with automatic classification functionality 16, based on a classification model, and a feedback portion 17 providing feedback data. The feedback data are then provided to a training procedure, here for example stored on a central server 111, for training classifiers and providing an improved classification model.

Then, the improved classification model is distributed from the central server 111 as an update to a set of instances of the software product installed on different computers 122A,122B,122C,122X (not shown), and/or the improved classification model might for example be further provided to a set of measurement devices with classification functionality (not shown).

Although the invention is illustrated above, partly with reference to some preferred embodiments, it must be understood that numerous modifications and combinations of different features of the embodiments can be made. All of these modifications lie within the scope of the appended claims.

What is claimed is:

1. A system for surveying for assigning a class of interest within measurement data of a total station or a laser tracker, the system comprising:
   a measurement device, selected from the total station or the laser tracker, with a data acquisition unit for acquiring measurement data for at least one measurement object having a reflector with specific properties, and
   a classification unit for executing a classification of the measurement data by a classification algorithm for providing an assignment of the at least one measurement object to a first class of interest within the measurement data, based on:
      the measurement data, and
      an classification model made available to the classification unit comprising at least the first class of interest,
   a feedback functionality for providing, in parallel with the acquisition and classification of the measurement data, feedback data based on user feedback by processing the assignment by a feedback procedure comprising at least one of:
      verification information for the assignment of the measurement object to the first class of interest,
      change information of the assignment of the measurement object to the first class of interest,
      a definition of a new class of interest,
      an instruction for removal of a class of interest from the classification model,
      a first selection of the measurement data to be used for the classification, and
      identification of a second selection of the measurement data to be ignored for further processing,
   wherein the feedback data is provided to a training unit comprising a training procedure, the training procedure being based on a machine learning algorithm and providing update information for the classification model, wherein the training procedure is adapted for processing feedback data from a multitude of feedback procedures taking into account at least one of a multitude of different objects, time data, and position data.

2. The system according to claim 1, wherein the feedback data being provided is based on at least one of:
   explicit feedback by means of the feedback functionality for the acquisition of the measurement data or by a software used for processing of the measurement data, and
   implicit feedback.

3. The system according to claim 1, wherein the feedback functionality is supported by a notification functionality for providing a status information of the classification, and wherein the notification functionality is based on at least one of:
   a visual representation of the status information,
   an acoustic notification of the status information.

4. The system according to claim 1, wherein the training procedure is adapted for at least one of:
   processing feedback data provided by classifications of a multitude of measurement data, and
   processing additional data provided to the training procedure.

5. The system according to claim 1, wherein the update information for the classification model is made available to a multitude of classification algorithms.

6. The system according to claim 1, wherein the classification model is provided out of a set of different models, differing from each other by at least one of:
   a region-specific classification parameter,
   a region-specific class of interest,
   a time-specific classification parameter,
   a time-specific class of interest,
   an application-specific classification parameter, and
   an application-specific class of interest,
   wherein the classification model is provided based on at least one of a time information, a location information, and an application information, corresponding with the acquisition of the measurement data.

7. The system according to claim 1, wherein the classification is based on at least one of:
   a class of interest based on a semantic property,
   a class of interest based on a geometrical property,
   linear classification,
   a support vector machine,
   a quadratic classifier,
   Kernel estimation,
   boosting,
   a decision tree,
   deep learning, and
   learning vector quantization.

8. A system for surveying for assigning a class of interest within measurement data, the system comprising:
   a measurement device with a data acquisition unit for acquiring measurement data for at least one measurement object, which is at least partly captured by the measurement data, and
   a classification unit for executing a classification of the measurement data by a classification algorithm for providing an assignment of the at least one measurement object to a first class of interest within the measurement data, based on:
      the measurement data, and
      an classification model made available to the classification unit comprising at least the first class of interest,
   a feedback functionality for providing, in parallel with the acquisition and classification of the measurement data, feedback data based on user feedback by processing the assignment by a feedback procedure comprising:
      verification information for the assignment of the measurement object to the first class of interest,
      a definition of a new class of interest, and a first selection of the measurement data to be used for the classification,
   wherein the feedback data is provided to a training unit comprising a training procedure, the training procedure being based on a machine learning algorithm and providing update information for the classification model, wherein the training procedure is adapted for processing feedback data from a multitude of feedback procedures.

9. The system according to claim 8, wherein the feedback data being provided is based on at least one of:
explicit feedback by means of the feedback functionality for the acquisition of the measurement data or by a software used for processing of the measurement data, and implicit feedback.

10. The system according to claim 8, wherein the feedback functionality is supported by a notification functionality providing a status information of the classification, and wherein the notification functionality is based on at least one of:
a visual representation of the status information,
an acoustic notification of the status information.

11. The system according to claim 8, wherein the training procedure is adapted for at least one of:
processing feedback data provided by classifications of a multitude of measurement data, and
processing additional data provided to the training procedure.

12. The system according to claim 8, wherein the update information for the classification model is made available to a multitude of classification algorithms.

13. The system according to claim 8, wherein the classification model is provided out of a set of different models, differing from each other by at least one of:
a region-specific classification parameter,
a region-specific class of interest,
a time-specific classification parameter,
a time-specific class of interest,
an application-specific classification parameter, and
an application-specific class of interest,
wherein the classification model is provided based on at least one of a time information, a location information, and an application information, corresponding with the acquisition of the measurement data.

14. The system according to claim 8, wherein the classification is based on at least one of:
a class of interest based on a semantic property,
a class of interest based on a geometrical property,
linear classification,
a support vector machine,
a quadratic classifier,
Kernel estimation,
boosting,
a decision tree,
deep learning, and
learning vector quantization.

15. A system for surveying for assigning a class of interest within measurement data, the system comprising:
a measurement device with a data acquisition unit for acquiring measurement data for at least one measurement object, which is at least partly captured by the measurement data, and
a classification unit for executing a classification of the measurement data by a classification algorithm for providing an assignment of the at least one measurement object to a first class of interest within the measurement data, based on:
the measurement data, and
an classification model made available to the classification unit comprising at least the first class of interest, the classification model having a region-specific and/or a time-specific classification parameter,
a feedback functionality for providing, in parallel with the acquisition and classification of the measurement data, feedback data based on user feedback by processing the assignment by a feedback procedure comprising at least one of:
verification information for the assignment of the measurement object to the first class of interest,
change information of the assignment of the measurement object to the first class of interest,
a definition of a new class of interest,
an instruction for removal of a class of interest from the classification model,
a first selection of the measurement data to be used for the classification, and
identification of a second selection of the measurement data to be ignored for further processing,
wherein the feedback data is provided to a training unit comprising a training procedure, the training procedure being based on a machine learning algorithm and providing update information for the classification model, wherein the training procedure is adapted for processing feedback data from a multitude of feedback procedures, namely feedback data taking into account a time of day, daytime and night time measurements, a particular part of the year, a season, a global position, longitude and latitude, or a climate zone.

16. The system according to claim 15, wherein the feedback data being provided is based on at least one of:
explicit feedback by means of the feedback functionality for the acquisition of the measurement data or by a software used for processing of the measurement data, and implicit feedback.

17. The system according to claim 15, wherein the feedback functionality is supported by a notification functionality providing a status information of the classification, and wherein the notification functionality is based on at least one of:
a visual representation of the status information,
an acoustic notification of the status information.

18. The system according to claim 15, wherein the training procedure is adapted for at least one of:
processing feedback data provided by classifications of a multitude of measurement data, and
processing additional data provided to the training procedure.

19. The system according to claim 15, wherein the update information for the classification model is made available to a multitude of classification algorithms.

20. The system according to claim 15, wherein the classification model is provided out of a set of different models, differing from each other by at least one of:
a region-specific classification parameter,
a region-specific class of interest,
a time-specific classification parameter,
a time-specific class of interest,
an application-specific classification parameter, and
an application-specific class of interest,
wherein the classification model is provided based on at least one of a time information, a location information, and an application information, corresponding with the acquisition of the measurement data.

21. The system according to claim 15, wherein the classification is based on at least one of:
a class of interest based on a semantic property,
a class of interest based on a geometrical property,
linear classification,
a support vector machine, a quadratic classifier,
Kernel estimation,
boosting,
a decision tree,
deep learning, and
learning vector quantization.

\* \* \* \* \*